March 28, 1950  R. G. WILSON  2,501,704
NEGATIVE FEED-BACK VACUUM TUBE VOLTMETER
Filed Feb. 13, 1946
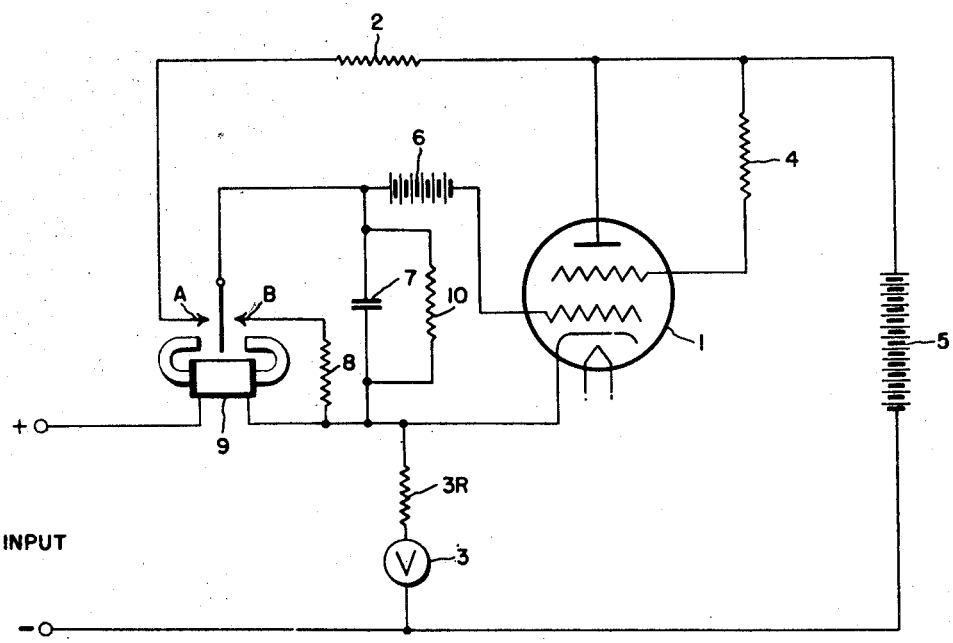
Inventor
R. G. Wilson
By M. O. Hayes
Attorney Patented Mar. 28, 1950

2,501,704

UNITED STATES PATENT OFFICE 2,501,704

NEGATIVE FEED-BACK VACUUM TUBE VOLTMETER

Robert G. Wilson, Washington, D. C.

Application February 13, 1946, Serial No. 647,416

11 Claims. (Cl. 171—95)

(Granted under the act of March 3, 1883, as amended April 30, 1928; 370 O. G. 757)

This invention relates to improvements in vacuum tube voltmeters. More specifically, it provides a vacuum tube voltmeter having a relay continually sensitive to minute changes in the current flowing in the input circuit for controlling the bias of a vacuum tube thereby to maintain the flow of current therethrough sufficient to produce across a deflection type voltmeter or high resistance current meter associated therewith an I-R voltage drop equal to the applied voltage to be measured.

In certain mine firing and like control circuits variations in battery potentials over long periods of time have been important factors in determining the period of usefulness of the mine or mechanism employing such circuits. The vacuum tube voltmeter of the subject invention is particularly well adapted for measuring and recording such potentials for the reason that it is adapted to measure D.-C. potentials with high accuracy in the order of one-half percent, with freedom from drift and the effects of changing circuit constants over a long period of time, and with rapid adjustment to changes in the voltage under test. Heretofore, such qualifications were not available in a single vacuum tube voltmeter of commercial design.

Previously, vacuum tube voltmeters have been deficient in at least one of several respects which made them unsuitable for the present application. In certain types of vacuum tube voltmeters it has usually been necessary to frequently "zero" the meter to compensate for changes in the circuit constants with age, changes in temperature, changes in the tube characteristics, etc. Furthermore, trouble has been encountered in some instruments with non-linearity of at least a portion of the meter range, due largely to non-linear characteristics in the vacuum tubes themselves.

In the present invention, the accuracy of the readings is substantially independent of changes in the circuit constants, being dependent solely upon the accuracy of the meter itself. No zero adjustment is necessary once the meter itself has been zero set correctly. Furthermore, the linearity of the vacuum tube voltmeter is as good as the linearity of the meter itself, and does not depend upon the tube characteristics.

An object of the invention is to provide new and improved means for employing a vacuum tube in a voltage measuring device.

A further object is to provide a vacuum tube voltmeter in which frequent zero adjustment is unnecessary.

A still further object is to provide a new and improved vacuum tube voltmeter whose accuracy is independent of changes in the circuit constants.

Still a further object is to provide a new and improved vacuum tube voltmeter whose linearity is not limited by the tube characteristics.

Another object is to provide a vacuum tube voltmeter suitable for use as a continuous recording instrument for D.-C. voltages.

Still another object is to provide a vacuum tube voltmeter in which the effective input impedance increases as the applied voltage is increased.

Still other objects and advantages not specifically set forth above will be apparent after perusal of the following detailed description of a preferred embodiment of the invention, reference being had to the accompanying drawing in which the single figure thereof illustrates a complete schematic diagram of the device.

Referring now to the drawing, the input circuit for the voltage to be measured is seen to contain the winding of a highly sensitive polarized relay 9, voltmeter 3, and meter resistance 3R. Whereas for clearness of explanation the voltmeter is shown as having an external resistance, it will of course, be understood that this resistance may be internal to the meter. Whereas the accuracy of the vacuum tube voltmeter is improved by the use of an extremely sensitive relay, its use also permits the apparent input impedance of the circuit to be high, as will be subsequently apparent. Whereas any suitable relay may be used, in the present preferred embodiment a relay known in the trade as a Weston type 813J is used. The relay is adapted to operate upon a current flow therein of 3 microamperes. Suitable damping means may be provided if desired, for example, a resistance paralleling the relay winding.

The relay 9 has a pair of contacts A and B adapted to make circuit with the armature selectively depending upon the direction of the flow of current which energizes the relay. When no current is flowing in the relay, the armature makes no contact, being in a neutral position; only when a sufficient current flows in a predetermined direction, that is, from the circuit under measurement into the voltmeter circuit, does the armature make contact with A, where it remains so long as the current flows. When the current stops or falls below the predetermined value as determined by the sensitivity of the relay, the armature swings back to neutral position. If the current through the relay reverses its direction, and attains a sufficient value, the armature swings to contact B, where it remains so long as the current flow equals or exceeds the predetermined minimum. Upon the fall of current below this value, the armature returns to neutral position.

The vacuum tube is shown at 1. Whereas any suitable tube may be used, for example, a triode, the sensitivity may be increased by using a multi-grid tube. Voltage to the screen grid of tube 1 is supplied from battery 5 through resistance 4.

A battery 6 in the grid lead to tube 1 normally biases the tube to cut-off when no voltage is applied in the input circuit of the vacuum tube voltmeter, the circuit between grid and cathode being traced as follows when there is no applied voltage, and when the relay armature is in a neutral position: grid through battery 6 thence through resistance 10 paralleled by condenser 7, to cathode. When relay 9 is energized by current flowing into the meter circuit from the circuit under test, and the armature makes contact at A, the grid of tube 1 is connected electrically with both the cathode and plate of the tube, the circuit being traced as follows: grid through battery 6 thence through contact A and the armature of relay 9 and resistance 2 to the tube plate, and also from battery 6 through resistance 10 paralleled by condenser 7, to cathode. When the relay 9 is energized by an oppositely flowing current from the vacuum tube voltmeter into the circuit under test and the relay armature makes contact at B, the grid circuit of tube 1 is traced as follows: grid through battery 6 through two parallel paths to cathode, one path through the armature and contact B of relay 9 and resistance 8, the other path through resistance 10 parralleled by condenser 7.

The plate-cathode circuit of tube 1 is traced as follows: plate through battery 5 through meter 3 through meter resistance 3R to cathode.

Assuming proper choice of values for the circuit components, operation of the vacuum tube voltmeter is substantially as follows: with no voltage applied to the input circuit, the relay armature makes no contact, the battery 6 biases tube 1 to cut-off so that no voltage is developed across meter 3 and meter resistance 3R, the grid circuit being completed through resistance 10. Upon the application of a voltage of a proper polarity to be measured, current flows in relay 9, swinging the armature to A, and current from the plate battery 5 begins to flow through resistance 2 into condenser 7, charging it in a manner tending to make the terminal nearest the grid positive with respect to the terminal connected to the cathode, it being assumed that the R-C time constant of elements 7 and 2 is considerably less than the time constant of elements 7 and 10. The bias of tube 1 becomes less negative as the positive voltage from condenser 7 opposes the negative voltage from battery 6, and current begins to flow in tube 1 through meter 3. As current flows through the tube, a voltage is developed across meter 3 and resistance 3R of a polarity which is the same as the polarity of the applied voltage under measurement.

Current continues to flow from battery 5 through resistance 2 into condenser 7 further increasing the charge thereon until the bias on tube 1 permits the current through the tube and meter 3 and meter resistance 3R to produce an I-R drop across 3 and 3R approximately equal to the applied voltage. At this moment, no appreciable current flows in relay 9, the relay is deenergized, and the armature swings back to neutral position. Condenser 7 begins to discharge slowly through resistance 10, the bias on tube 1 changes in a negative direction, and the flow of current through tube 1 falls.

The I-R drop across the meter and resistance 3R decreases with the decreasing current, and no longer equals the applied voltage. When it falls to a value determined by the circuit constants and the sensitivity of the relay, the current flowing into the input circuit from the circuit under measurement again becomes sufficient to energize relay 9, the armature swings to contact A, and the operation repeats itself.

Assuming a steady D-C voltage across the input terminals, the deflection of meter 3 is thus seen to be periodically varied within narrow limits, at a rate depending upon the sensitivity of relay 9 and the charge and discharge time constants of condenser 7, as determined by the capacity thereof, the values of resistances 2 and 10, and the value of battery 5, and the meter resistances. By proper damping of meter 3 and choice of circuit constants, the indication of meter 3 is substantially constant and vibration of the indicating pointer is not noticeable. In the present preferred embodiment, the relay 9 may operate at a rate of three to four times per second, depending upon the applied voltage and other factors.

Assume now by way of illustration, that the voltage in the circuit under test falls substantially below the voltage developed across resistance 3R and meter 3. A small current will flow from the vacuum tube voltmeter through relay 9 into the circuit under test. When the current flow attains a value sufficient to energize the relay 9, the relay armature makes contact at B, condenser 7 is quickly discharged through relatively low resistance 8, the voltage on the grid of tube 1 changes in a negative direction at a somewhat rapid rate, reducing the current flow through tube 1 and thereby reducing the voltage drop across resistance 3R and meter 3. When the current flow has decreased to the point where the I-R drop again substantially equals the voltage under test, the current through relay 9 stops or becomes insufficient to energize the relay, and the armature returns to neutral position.

It is thus seen that the relay 9 maintains the bias of tube 1 at substantially that value which allows that current to flow through tube 1 which produces an I-R drop in 3R and 3 equal to the applied voltage, and operates to decrease the bias on tube 1 when the voltage under test exceeds the I-R drop, and to increase the bias on tube 1 when the voltage under test is less than the I-R drop.

It is further noted that the high resistance or grid leak 10 provides for a periodic check or "look" at the applied voltage even when it is substantially constant, by periodically discharging condenser 7 until the bias on tube 1 increases until the current flow therethrough falls to a value which causes relay 9 to be energized, the armature making contact at A.

The values of resistances 2, 8, and 10, and condenser 7, are not critical, so long as certain relations are maintained. To permit the condenser 7 to charge properly when the relay armature makes contact at A, it is essential that the time constant of condenser 7 and resistance 10 be considerably longer than the time constant of condenser 7 and the combined resistance of resistances 2 and 3R and any resistance of meter 3. Any suitable value of resistance at 10 may be used, in the present embodiment being of the order of ten megohms. If the circuit is to operate as heretofore described to take a "look" at a steady applied input voltage several times per second, the time constant of condenser 7 and resistance 10 may be properly selected, in joint consideration with other circuit constants, as will be evident to those skilled in the art to which the invention pertains. The resistance of 8 should be relatively small in comparison with the resistance of element 10.

The voltage of battery 5 is not critical, so long as it is substantially greater than the voltage to be measured, and of course must be greater than the voltage of battery 6. In the present embodiment, battery 5 supplies about 300 volts for a full scale deflection on meter 3 of 150 volts.

It will be noted that since the sensitivity of the vacuum tube voltmeter is controlled largely by the current requirements of relay 9, which are constant, the apparent input impedance increases as the applied voltage is increased. The momentary current which flows from the vacuum tube voltmeter into the circuit under test under certain aforementioned conditions is insufficient to be of concern in most applications of the subject vacuum tube voltmeter.

Any suitable means may be used to supply filament potential to tube 1.

There is provided, then, a linear vacuum tube voltmeter of high stability entirely free from the influence of changing circuit constants and changing tube characteristics. The device is especially suitable for use as a recording instrument because of its freedom from drift, etc.

Whereas for clearness of explanation, the voltmeter has been illustrated as having an external resistance, it will be understood that a voltmeter having an internal resistance of sufficient value may be used. It is understood, also that the meter 3 may be of the recording type, and may be any convenient distance from the rest of the apparatus so long as the resistance of leads thereto are not such as to introduce errors therein.

Whereas the invention has been shown and described herein with reference to a certain preferred embodiment, it will be apparent to those skilled in the art to which the invention pertains, after reading the subject description, that modifications may be made without departing from the spirit or scope of the invention, and it is therefore wished to include herein all equivalents, mechanical and electrical.

The invention herein described and claimed may be manufactured and used by or for the Government of the United States of America for governmental purposes without the payment of any royalties thereon or therefor.

What is claimed as new and desired to be secured by Letters Patent of the United States is:

1. In a vacuum tube voltmeter, an input circuit including a resistance and a current sensitive device, means for developing a bucking voltage across said resistance of a polarity opposing the current tending to flow therein due to a voltage to be measured applied to said input circuit, a vacuum tube for regulating the magnitude of said bucking voltage, biasing means for said vacuum tube including a source of D.-C. potential and an energy storage device, said source of D.-C. potential and said energy storage device being adapted to supply potentials of opposite polarities to the control grid of said vacuum tube, and means operated from said current sensitive device for altering the energy stored in said energy storage device thereby to alter the bias on said vacuum tube when the current in said input circuit substantially ceases or changes direction, and an indicating meter in said input circuit having a deflection proportional to the current flowing in said resistance.

2. In a vacuum tube voltmeter, the combination of an input circuit including a resistance, a vacuum tube, biasing means for said tube including a source of D.-C. potential and an energy storage device, said source of D.-C. potential and said energy storage device being adapted to supply potentials of opposite polarities to the control grid of said vacuum tube, a circuit connecting said resistance and said vacuum tube including energizing means for energizing the circuit and an indicating meter, said indicating meter also being in said input circuit, the amount of current through said resistance from said energizing means being regulated from said vacuum tube, the polarity of voltage developed across said resistance due to current from said energizing means being such as to oppose the flow of current in said input circuit due to the application of a voltage to be measured, and means automatically responsive to the direction of the flow of current in said input circuit for regulating the bias on said vacuum tube thereby to maintain the flow of current through said vacuum tube at a value which develops a voltage drop across said resistance substantially equal to the applied voltage in said input circuit, said last named means including charging and discharging circuits for said energy storage device and having resistor elements individual thereto adapted to be selectively connected to said energy storage device when the magnitudes of the voltage drop across said resistance and the voltage applied to said input circuit vary in predetermined amounts with respect to each other.

3. A vacuum tube voltmeter comprising, in combination, an indicating voltmeter, a vacuum tube having at least one grid, a cathode, and an anode; biasing means for said tube for applying a predetermined bias thereto other than zero when no voltage to be measured is applied to the voltmeter; a battery; a resistor; a circuit connecting said vacuum tube, said battery, said resistor, and said indicating voltmeter all in series relationship whereby the deflection of said meter is proportional to the current flowing between the cathode and anode of said tube; an input circuit including said resistor, said indicating voltmeter and a polarized relay having a plurality of contacts; and means controlled from the contacts of said polarized relay for selectively increasing or decreasing said predetermined bias on the grid of said vacuum tube depending upon the direction of current flowing in said polarized relay, thereby to maintain the flow of current in said vacuum tube at a value which creates a voltage drop across said indicating voltmeter and said resistor substantially equal to the voltage applied to said input circuit.

4. Apparatus according to claim 3 wherein said biasing means includes a condenser connected between the grid and cathode of said vacuum tube and adapted to have its charge and discharge controlled from the contacts of said relay.

5. A vacuum tube voltmeter comprising, in combination, a vacuum tube having a grid, cathode, and anode, biasing means for said tube for applying a predetermined bias thereto other than zero when no voltage to be measured is applied to the voltmeter, an input circuit including an indicating voltmeter, a resistance included in said input circuit, a second circuit associated with said vacuum tube including energizing means, said resistor and said indicating voltmeter and having the current therein controlled from said tube, and means for altering said predetermined bias on the grid of said vacuum tube thereby to maintain the voltage drop across said indicating voltmeter and said resistor at substantially the value of the voltage under measurement, said last named means including a polarized relay having the winding thereof in said input circuit and having a plurality of contacts adapted to be selectively closed depending upon whether the voltage under measurement substantially exceeds or is substantially less than the voltage across said indicating voltmeter, a condenser adapted to additionally regulate the bias on the grid of said vacuum tube depending upon the amount of charge thereon, and a plurality of resistance means selectively connected to said condenser through individual contacts of said polarized relay thereby to increase or decrease the charge on said condenser when the relay is energized.

6. In a vacuum tube voltmeter, the combination of a vacuum tube having at least a plate, a grid, and a cathode; a first battery supplying power to the plate of said vacuum tube; a second battery supplying bias to the grid of said vacuum tube; an input circuit including an indicating meter having substantial resistance and a polarized relay having a plurality of contacts, the contacts of said relay being selectively closed depending upon the direction of the flow of current which energizes the relay; circuit means connecting said indicating meter with said vacuum tube whereby the current flowing through said tube also flows through said indicating meter, the polarity of the voltage drop across said meter being such as to oppose the flow of current into said input circuit from the circuit under test; a condenser adapted to have the charge thereon varied for additionally controlling the bias on the grid of said tube; a first resistance connecting said condenser with said first battery through one of the contacts of said relay thereby to charge the condenser when said polarized relay is energized by current flowing into the indicating meter from the circuit under test; and a second resistance for discharging said condenser through the other contact of said polarized relay when the relay is energized by current flowing from the tube into the circuit under test, whereby the voltage across said indicating meter due to current flowing in said tube is maintained substantially equal to the voltage applied to said input circuit.

7. In a vacuum tube voltmeter, the combination of a vacuum tube having a grid, a plate, and a cathode; a first circuit including a resistance element and a current sensitive device responsive to changes in the magnitude and direction of current flowing in the circuit; a second circuit including said resistance element and the cathode and plate of said vacuum tube and including energizing means and indicating means sensitive to changes in the flow of current in the second circuit; and means operated from said current sensitive device for regulating the flow of current in said vacuum tube to a predetermined value which causes a voltage drop across said resistance element substantially equal to the voltage applied to said input circuit; said last named means including a condenser adapted to vary the potential on the grid of said vacuum tube depending upon the amount of charge on the condenser, charging and discharging circuits adapted to be selectively connected to said condenser by said current sensitive device in accordance with the direction of the flow of current therethrough, and a resistor connected in parallel with the condenser for providing a continual drain thereon, said drain resulting in periodic operations of said current sensitive device to readjust the charge on said condenser to a value which provides said predetermined current through said vacuum tube.

8. In a vacuum tube voltmeter, in combination, a vacuum tube having at least an anode, a grid, and a cathode; an input circuit including in series a first resistance, an indicating device, and the winding of a polarized relay having a pair of contacts adapted to engage the relay armature selectively in accordance with the direction of the flow of current in said winding; an anode-cathode circuit for said vacuum tube including energizing means and including said first resistance and said indicating device; a circuit connecting the grid and cathode of said vacuum tube and including in series a battery having the negative terminal connected to said grid and a condenser having a resistance connected in parallel thereto; a connection between the armature of said relay and the junction between said battery and condenser; a connection including a series resistor between one of the contacts of said relay and said cathode; and a connection including a resistance element between the other contact of said relay and said anode.

9. In a vacuum tube voltmeter, in combination, an electron discharge tube having a cathode, a grid, and an anode; an input circuit including a resistance and a current sensitive device responsive to changes in the magnitude and direction of current flowing in the circuit; a second circuit including said resistance, the anode-cathode path of said electron discharge tube, energizing means, and indicating means; a third circuit connecting the grid and cathode of said electron discharge tube and including an energy storage device adapted to alter the bias on said grid in accordance with the degree of charge thereon and a battery adapted to normally bias said grid to cut-off in the absence of a charge on said energy storage device, and means operated from said current sensitive device for regulating the charge on said energy storage device thereby to maintain the current through said electron discharge tube at a value which produces a voltage drop across said resistance substantially equal to the voltage applied to said input circuit.

10. In a vacuum tube voltmeter, in combination, an electron discharge tube having a cathode, a grid, and an anode; an input circuit including a resistance and a current sensitive device responsive to changes in the magnitude and direction of current flowing in the circuit; a second circuit including said resistance, the anode-cathode path of said electron discharge tube, energizing means, and indicating means; said indicating means being also connected in said input circuit; a third circuit connecting the grid and cathode of said electron discharge tube and including an energy storage device adapted to alter the bias on said grid in accordance with the degree of charge thereon and a battery adapted to normally bias said grid to cut-off in the absence of a charge on said energy storage device, charging means including a resistance element for said energy storage device, and discharging means including another resistance element for said energy storage device, said charging and discharging means being adapted to be selectively connected to said energy storage device in response to change in the direction of the flow of current in said current sensitive device, said resistance elements having predetermined relative values whereby the time intervals of said charge and discharge operations have predetermined values, said charging and discharging operations regulating the charge on said energy storage device in a manner to maintain the current through said electron discharge tube at a value which produces a voltage drop across said resistance substantially equal to the voltage applied to said input circuit.

11. In a vacuum tube voltmeter, in combination, an electron discharge device having an anode, grid, and cathode; an input circuit including a first resistance and a current sensitive device responsive to changes in the direction and magnitude of the flow of current in the circuit; a second circuit including the cathode-anode path of said electron discharge device, said first resistance, energizing means, and indicating means; a third circuit connecting said grid and cathode including a source of D.-C. potential for supplying a steady component of bias to said grid and a condenser adapted to supply a variable component of bias in accordance with the degree of charge thereon, charge regulating means connecting said condenser with said current sensitive device for regulating the charge on the condenser to a value which biases the electron discharge device to a point where the current through said electron discharge device is maintained at a predetermined value with relation to the voltage applied to said input circuit, and a second resistance of predetermined value connected across said condenser and adapted to slowly discharge the condenser thereby to render said charge regulating means periodically operated while the voltage applied to said input circuit maintains a steady value.

ROBERT G. WILSON.

REFERENCES CITED

The following references are of record in the file of this patent:

UNITED STATES PATENTS

| Number | Name | Date |
| --- | --- | --- |
| 1,972,141 | Gilbert | Sept. 4, 1934 |
| 2,014,102 | Conklin | Sept. 10, 1935 |
| 2,276,152 | Bull | Mar. 10, 1942 |
| 2,291,648 | Rider | Aug. 4, 1942 |